Sept. 21, 1965     C. S. WHITE     3,207,000

CRANKSHAFT DAMPER

Filed Aug. 23, 1961

INVENTOR.
Charles S. White.
BY
Harness, Dickey & Pierce
ATTORNEYS.

United States Patent Office 3,207,000
Patented Sept. 21, 1965

3,207,000
CRANKSHAFT DAMPER
Charles S. White, Rte. 3, Box 454–H, Palmdale, Calif.
Filed Aug. 23, 1961, Ser. No. 133,514
11 Claims. (Cl. 74—574)

This invention relates to dampers for crankshafts, and particularly to a crankshaft damper having mating faces of low friction material.

Difficulty has been experienced with crankshaft dampers because of the high break-away force required between the mating surfaces and the lack of uniformity in the resulting static friction. The present invention contemplates the use of low friction washers in dampers, such as the Lancaster damper, which is well known in the art. Two freely rotatable disks are mounted on a flanged hub secured to a crankshaft with the flange disposed therebetween. Brake linings are applied to opposite faces of the flange to rotate therewith in engagement with the disks which are forced thereagainst by springs carried thereby.

When uniform rotation occurs to the crankshaft, there will be torsional vibration present and the disks will rotate with the hub and will add a small percentage of inertia to the engine. When torsional vibration occurs at the hub, the motion of the disks will depend upon the amount of friction had with the brake lining on the flange. When the friction torque is small, the disks will rotate uniformly with the shaft. In the presence of torsional vibration, relative slip will occur between the flange and disks following the amplitude of the hub motion. When slippage occurs, the vibration energy is dissipated.

When too great a friction is present between the brake lining and the disks, the disks rotate with the brake lining and follow the vibrational motion of the hub and substantially accentuate it. Therefore, it is desirable to have the lowest friction possible between the flange and disks to assure that the vibratory energy will be dissipated. The device is mounted on the point of a shaft at which the greatest degree of vibration occurs, that is to say, where the torsional amplitude is the greatest, as the device becomes useless if placed at the node of the vibration path.

For the purpose of illustration, a Lancaster damper is shown, modified to have low friction surfaces secured to opposite faces of the flange in engagement with the faces of the disks. Washers were constructed of laminated fabric materials having a 4-inch outside diameter and a 3-inch inside diameter providing an annular ring having a ½-inch face width. A polytetrafluoroethylene cloth, preferably of the compound type, is woven, compacted or otherwise formed to have a backing face which is readily bondable. The backing face is secured by a bondable material to the layers of the backing washer and is cured therewith to the B stage. The device may be heated after assembly when the washers are in pressure engagement with the disks to soften the material bonding the layers together. This provides an exact mating relation between the low friction surface and those of the disks. Immediately thereafter, the bonding material is set in the presence of the heat at approximately 300° F. This produces an exact mating relation between the surface of the polytetrafluoroethylene material with the faces of the disks. The polytetrafluoroethylene filaments of the threads forming the low friction faces have extremely low friction characteristics with a high resistance against cold-flow. The filaments withstand wear and distortion which might occur due to the movement between the faces of the disks and the engaged surfaces of the low friction washers. It was found that such low friction engagement permits a very low initial break-away force and the immediate dissipation of the torsional vibration without producing any substantial amount of heat. A damper employing such low friction faces is exceedingly simple in construction, is provided at a minimum cost, and has exceedingly high efficiency.

Accordingly, the main objects of the invention are: to provide a damper for a crankshaft which is exceedingly efficient, has a low break-away force and remains cool in operation; to provide a crankshaft damper having a pair of washers containing low friction faces of polytetrafluoroethylene secured under pressure between the faces of freely movable disks, and by heating the damper to soften and cure the low friction washers to obtain perfect mating relation with the faces of the disks; to bond low friction washerlike elements or layers of fabric which are bonded together and to a flange of a hub when set to the B stage at which the material is only partially cured until heat and pressure are applied after assembly between a pair of freely rotatable disks mated therewith, and, in general, to provide a damper for a crankshaft which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein.

Figure 1:
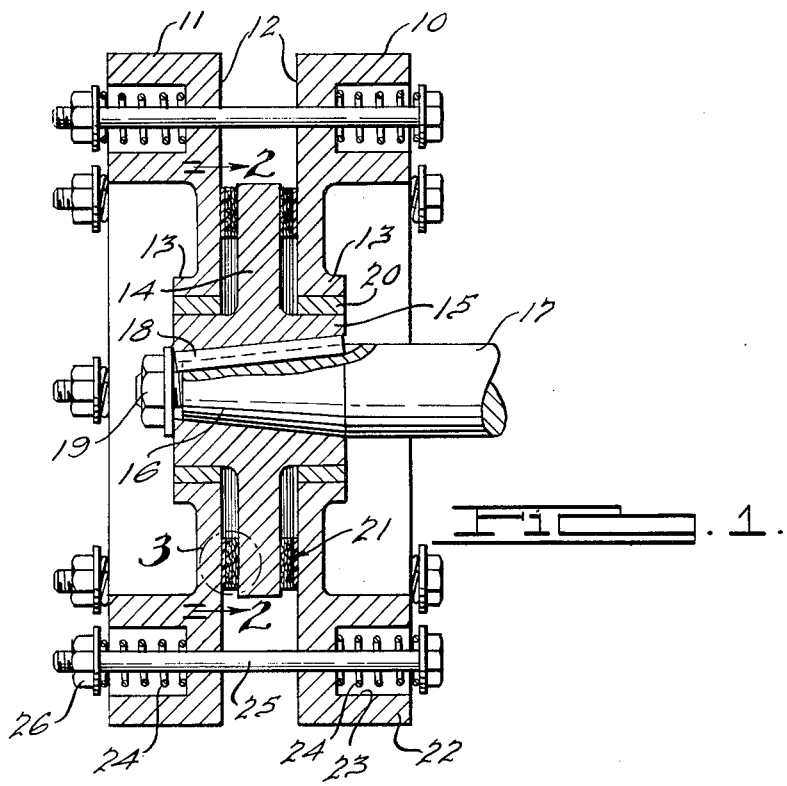
FIGURE 1 is a sectional view of a friction damper having low friction washers which embody features of the present invention mounted thereon.
Figures 2, 3:
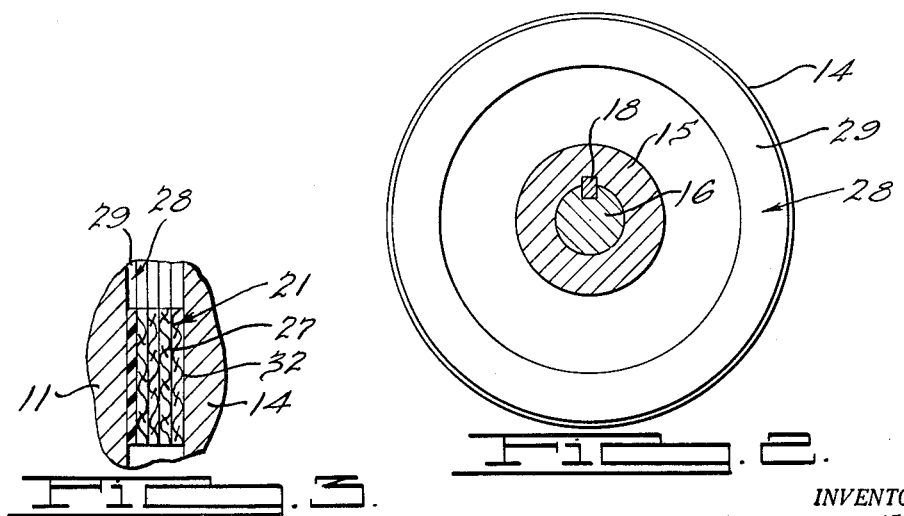
FIG. 2 is a sectional view of the structure illustrated in FIG. 1, taken on the line 2—2 thereof.
FIG. 3 is an enlarged, broken sectional view of the structure illustrated in FIG. 1, located within the circle 3 thereof.

The friction damper of the present invention is shown by way of example as of the Lancaster type. The damper has a pair of disks 10 and 11 containing polished surfaces 12 in facing relation to each other. The disks have hubs 13 at the center provided with annular bearings 20 on the interior thereof. A cylindrical flange 14 is carried by a hub 15 which is secured to the tapered end 16 of a crankshaft 17, locked in position thereon by a key 18 and nut 19. Washers 21, constructed in accordance with the present invention, are cycle-welded or otherwise secured to opposite faces of the flange 14 in position to engage the polished surfaces 12 of the disks 10 and 11.

The disks 10 and 11 have a heavy outer rib 22 containing aligned apertures 23 in which springs 24 are supported and placed under compression by bolts 25 when nuts 26 are secured on the ends thereof. The springs apply a predetermined pressure for urging the disks 10 and 11 against the engaging faces of the washers 21. This will cause the disks 10 and 11 to rotate with the flange 14 and the hub when the shaft is rotating in a normal manner without developing any torsional vibration. The washers 21 have a backing portion 27 which is preferably made of one or more layers of clothlike material, such as cotton, nylon, glass or any layers of materials from which a washer could be made when bonded together. A low friction facing washer 28 is made of a compound cloth having an outer face made from threads of polytetrafluoroethylene, known in the trade as "Teflon," and a backing layer made of bondable threads such as cotton, nylon, glass and the like. The low friction threads and the bondable threads are so woven or otherwise joined that the bondable threads will retain the Teflon threads on the face of the washer when the boundable threads are secured to the backing portion 27 thereof. It is to be understood that the facing washer 28 can be of any clothlike material having a substantial amount of the low friction fibers appearing on the engaging face of the washer 21. The woven layer herein illustrated and described functions perfectly for securing the non-bondable outer low friction layer 29 to the backing portion of the washer. The bonding material is preferably thermosetting and may be phenol aldehyde resins, including phenol formaldehyde, urea-formaldehyde and the like which were found suitable for curing the layers to the B stage from which they are softened and cured to the C or hardened stage when heat is again applied, as pointed out above.

After the materials have been assembled and partially cured at least to the B stage, the washers are cycle-welded or otherwise bonded at 32 to opposite faces of the flange 14 of the hub 15. After the washers are secured upon the flange 14, the disks are assembled on the hub 15 and forced with a predetermined pressure provided by the springs 24 against the surface of the low friction layers 29. Thereafter, the assembly is heated to approximately 300° F. to have the pressure deform the softened washer bonding material so that the low friction layer 29 will exactly conform to the polished surface 12 of the disks 10 and 11. This will occur just prior to the time that the heat cures the resin in a manner well known in the art, to harden the material of the washer 21 so that it can no longer be deformed.

The extreme low friction engagement between the material 29 and the surface 12 of the disks 10 and 11 will maintain throughout the life of the disks and the same dissipation of the torsional vibration will occur throughout the life of the crankshaft. The engagement between the washers 21 and the disks 10 and 11 requires a very low break-away force so that as soon as torsional vibration is present, even in small amounts, the disks will function to dissipate the energy as soon as vibration commences. On a test specimen at 50 cycles per second, with a plus or minus ½° amplitude and with a spring load of substantially 1000 pounds on a spaced width of .146 inch, the break-away force was 140 inch pounds and the output torque was 288 inch pounds. The test was conducted for over ten million cycles and the static friction was substantially uniform throughout the entire test. During the test, the Lissajous figure on the oscilloscope showed a square shape, indicating no loss in damping force during the stroke. This is what one would expect when the static friction was maintained throughout the test with substantially no evidence of damage to any of the parts under microscopic examination. The damper of the present invention, therefore, is highly efficient and substantially indestructible and should be effective throughout the life of the crankshaft without any change in static friction.

What is claimed is:

1. A crankshaft torsional vibration damper comprising an outwardly extending annular member secured to the crankshaft for rotation therewith, a rotatable member mounted concentrically around said crankshaft, said rotatable member having a face which is adjacent a face of said outwardly extending member and which is movable with respect thereto, and a layer containing polytetrafluoroethylene on at least a portion of the face of one of said members in slidable engagement with the face of the other of said members.

2. A crankshaft torsional vibration damper as set forth in a claim 1 wherein said polytetrafluoroethylene is in the form of fibers thereof and wherein said layer also includes an organic bonding resin.

3. A crankshaft torsional vibration damper comprising an outwardly extending annular member secured to the crankshaft for rotation therewith, a rotatable member mounted concentrically around said crankshaft, said rotatable member having a face which is adjacent a face of said outwardly extending member and which is movable with respect thereto, and a layer containing polytetrafluoroethylene cloth material secured to at least a portion of the face of one of said members in slidable engagement with the face of the other of said members.

4. A crankshaft torsional vibration damper as set forth in claim 3 wherein said polytetrafluoroethylene cloth material has filaments of another material interwoven therein and wherein said cloth material is secured by a backing layer of organic resin bonding material bonded to said filaments.

5. A crankshaft torsional vibration damper comprising an outwardly extending annular member secured to the crankshaft for rotation therewith, a rotatable member mounted concentrically around said crankshaft for rotation independently thereof, said rotatable member having a face adjacent a face of said outwardly extending member, a layer containing polytetrafluoroethylene and an organic bonding resin secured to at least a portion of the face of one of said members, and resilient means biasing the face of the other of said members and said layer into contact with each other.

6. A method for constructing a crankshaft vibration damper of the type having an outwardly extending flange member secured to the crankshaft for rotation therewith and a rotatable member mounted concentrically around the crankshaft, said rotatable member having a face which is adjacent a face of said outwardly extending member and which is movable with respect thereto, said method including the steps of assembling to the face of one of said members a layer of material including polytetrafluoroethylene and a heat softenable organic bonding resin, resiliently pressing the other of said members into contact with said layer and heating to soften said layer thereby producing uniform face-to-face contact between said layer and the face of said other member.

7. A method for constructing a crankshaft vibration damper of the type having an outwardly extending flange member secured to the crankshaft for rotation therewith and a rotatable member mounted concentrically around the crankshaft for rotation independently thereof, said rotatable member having a face adjacent a face of said outwardly extending member, said method including the steps of assembling to the face of one of said members a layer of material including a low friction organic polymer, resiliently pressing the other of said members into contact with said layer and heating to soften said layer thereby producing uniform face-to-face contact between said layer and the face of said other member.

8. A method as set forth in claim 7 wherein said layer has a face of polytetrafluoroethylene and a backing of thermosetting bonding material, and wherein said heating causes curing of said thermosetting bonding material.

9. A crankshaft torsional vibration damper comprising a pair of members, means for mounting at least one of said members on a crankshaft for rotation therewith and movement relative to the other of said members, said respective members having opposing faces, and a layer containing polytetrafluoroethylene on at least a portion of the face of one of said members in slidable engagement with the face of the other of said members.

10. A crankshaft torsional vibration damper as set forth in claim 9 wherein said polytetrafluoroethylene is in the form of fibers thereof and wherein said layer also includes an organic bonding resin.

11. A crankshaft torsional vibration damper as set forth in claim 9 wherein said polytetrafluoroethylene is in the form of a cloth material having filaments of another material interwoven therein, and wherein said cloth material is secured to the face of said one of said members by a backing layer of organic resin bonding material bonded to said filaments.

References Cited by the Examiner

UNITED STATES PATENTS

| | | | |
|---|---|---|---|
| 1,315,058 | 9/19 | Vincent | 74—574 |
| 1,518,360 | 12/24 | Royce | 74—574 |
| 1,670,369 | 5/28 | MacPherson | 74—574 |
| 1,830,600 | 11/31 | Fifield | 74—574 |
| 1,850,684 | 3/32 | Nathan | 74—216 |
| 2,440,956 | 5/48 | Kearns et al. | 74—574 X |

FOREIGN PATENTS

| | | |
|---|---|---|
| 858,739 | 1/61 | Great Britain. |

BROUGHTON G. DURHAM, *Primary Examiner.*